United States Patent [19]

Daugas

[11] 4,334,409
[45] Jun. 15, 1982

[54] DEVICE FOR RECOVERING HEAT ENERGY IN A SUPERCHARGED INTERNAL-COMBUSTION ENGINE

[75] Inventor: Claude Daugas, Les Clayes sous Bois, France

[73] Assignee: Societe d'Etudes de Machines Thermiques S.E.M.T., Saint-Denis, France

[21] Appl. No.: 123,003

[22] Filed: Feb. 20, 1980

[30] Foreign Application Priority Data

Feb. 22, 1979 [FR] France .................................. 79 04555

[51] Int. Cl.³ ...................... F01K 23/08; F01K 23/10
[52] U.S. Cl. ..................................................... 60/618
[58] Field of Search ................................ 60/599, 618

[56] References Cited

U.S. PATENT DOCUMENTS

| | | | |
|---|---|---|---|
| 3,350,876 | 11/1967 | Johnson | 60/618 |
| 4,033,137 | 7/1977 | Mandrin | 60/618 X |
| 4,182,127 | 1/1980 | Johnson | 60/618 |
| 4,232,522 | 11/1980 | Steiger | 60/618 |

Primary Examiner—Michael Koczo, Jr.
Attorney, Agent, or Firm—Kenyon & Kenyon

[57] ABSTRACT

A method and a device for recovering energy from a supercharged internal-combustion engine by producing a complementary amount of energy from a system operating on a Rankine cycle, includes preheating the working fluid used in the Rankine cycle through heat exchange with the air issuing from the compressor of the supercharger of the internal-combustion engine.

2 Claims, 1 Drawing Figure

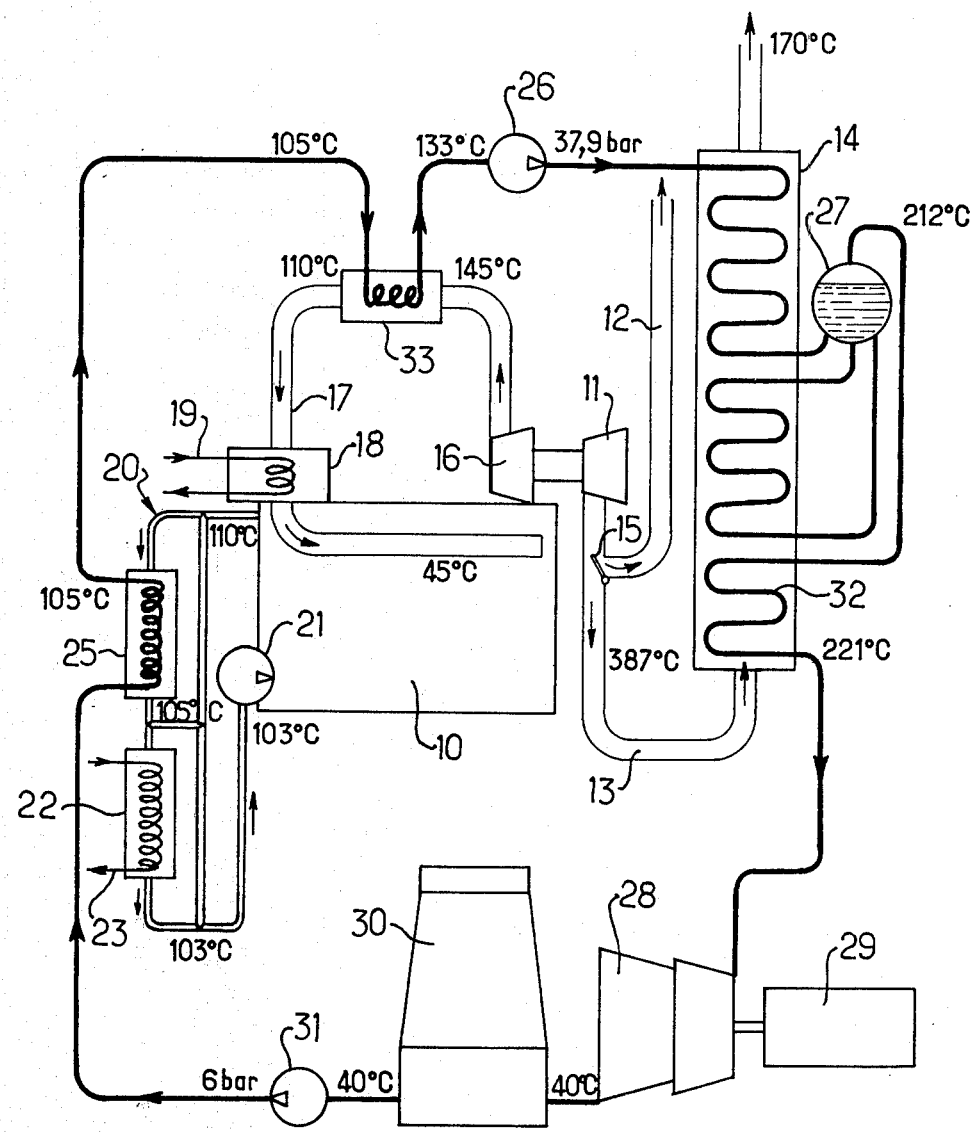

DEVICE FOR RECOVERING HEAT ENERGY IN A SUPERCHARGED INTERNAL-COMBUSTION ENGINE

The present invention relates generally to a device for recovering heat energy in a supercharged internal-combustion engine, in order to produce a complementary amount of energy by means of a Rankine cycle.

The current trend is to maximize the economy of internal-combustion engines, particularly of large-sized supercharged diesel engines, instead of only their output.

It is known to use a Rankine cycle for producing a complementary amount of energy by recovering the otherwise wasted heat energy from an internal combustion engine. In such a cycle, a liquid working fluid is usually heated in a boiler under constant pressure to a superheated vapor then expanded to produce energy, condensed, and then heated again under pressure and vaporized, and so forth.

Use is generally made of only the heat energy of the exhaust gases of the internal combustion engine to heat the working fluid. In some cases, in order to preheat the working fluid from its condensation temperature to a temperature as close as possible to its boiling temperature, use is made of a portion of the heat of the high temperature water in the cooling circuit of the internal combustion engine, this cooling water being heated in the engine to a temperature as high as possible.

The present invention has precisely for its object to additionally preheat the working fluid and therefore improve the recovery of energy from a reciprocating internal combustion engine, when the engine is of the supercharged type.

The invention provides to this end a method for recovering heat energy from a supercharged internal combustion engine, by producing a complementary amount of energy from a system operation by means of a Rankine cycle, the method including preheating a working fluid from its condensation temperature to a point near its boiling temperature through heat exchange with the engine cooling liquid, wherein the improvement comprises additionally pre-heating the working fluid through heat exchange with the air issuing from the supercharging compressor of the internal-combustion engine.

The invention also provides a device for recovering heat energy by carrying out the above method, and which is characterized in that the circuit for heating the working fluid used for producing a complementary amount of energy by means of a Rankine cycle, comprises, in series with a heat exchanger traversed by the engine refrigerating liquid, a heat exchanger supplied with the air issuing from the engine supercharging compressor.

It has been found that, in an engine with a high supercharging ratio, the air issuing from the supercharging compressor is at a higher temperature than the maximum temperature which can be obtained in the engine cooling water circuit. This high level heat energy of the air issuing from the supercharging compressor is, according to the invention, used in its turn to preheat the working fluid to a temperature still nearer to its vaporization temperature. This allows the economizer portion of the engine exhaust gas heat recovery boiler, and therefore the flow rate of the working fluid to be increased, thus permitting the power output of the expansion engine used in the Rankine cycle, and therefore the overall efficiency of the method or the device, to be also increased.

The invention will be better understood and other purposes details, characterizing features and advantages of the latter will appear more clearly from the following explanatory description, given solely by way of example, with reference to the appended drawing wherein the single FIGURE diagrammatically illustrates the heat energy recovery apparatus according to the invention.

In a conventional manner, an internal combustion engine 10 is associated with a turbosupercharger set in which the turbine 11 is driven (not shown) by the engine exhaust gases, which can thereafter issue from the turbine through either a conduit 12 which discharges them into the atmosphere or a conduit 13 leading to a heat exchanger 14, depending on the position of a valve 15.

The turbine 11 driven by the exhaust gases drives in its turn a compressor 16 which supplies compressed supercharging air to the engine 10 through a conduit 17. The compressed air issuing from the compressor 16 is at a high temperature and is caused to pass through a heat exchanger 18 cooled by a cold water circuit 19, before being conveyed to the engine 10.

The engine also comprises a water cooling circuit 20 including a circulation pump 21 and conduits, as shown in the drawing. These conduits pass part of the cooling water through a heat exchanger 22 fed by a cold water circuit 23, as illustrated.

The recovery of energy by means of a Rankine cycle consists, as mentioned earlier, in causing a working fluid to circulate through a closed circuit including a preheating heat exchanger 25 supplied with a portion of the high temperature cooling water issuing from the engine 10, a feed pump 26 subjecting this fluid to pressure, the afore-mentioned heat exchanger 14 traversed by the exhaust gases, and which is associated with a boiler 27 as illustrated in the drawings, an expansion engine 28 constituted here by a two-stage radial-flow turbine driving for example an asynchronous alternator 29, a condenser 30 and a condensate pump 31.

It should be noted incidentally that the heat exchanger 14 supplied with the exhaust gases includes a superheater portion designated by the reference number 32.

According to the invention, the working fluid issuing from the heat exchanger 25 and which has been preheated to a point near its vaporization temperature through heat exchange with a portion of the high temperature water of the cooling circuit of the engine 10 is also preheated through heat exchange with hot compressed air furnished by the engine supercharging compressor 16, by passing through a heat exchanger 33 supplied with the hot compressed air.

It is seen in the drawing that this additional preheating step allows the temperature of the working fluid to be raised from 105° C. to 133° C. while at the same time cooling the compressed supercharging air from 145° C. to 110° C.

The device represented in the Figure operates in a conventional manner as follows.

The condensed working fluid extracted by the condensate pump 31 from the condenser 30 passes through the heat exchanger 25 supplied with the high-temperature water of the engine cooling circuit, is thereafter additionally preheated by the engine supercharging air in the exchanger 33, is compressed by the pump 26, is vaporized and super-heated in the heat exchanger 14 supplied with the exhaust gases, is conveyed to the two-stage radial-flow turbine 28, where it is expanded, thus producing energy, and is finally returned to the condenser 30 from which it is again extracted by the pump 31, and so on.

In the particular case illustrated, expansion of the working fluid in the turbine 28 allows the latter, and therefore the alternator 29, to be driven to produce electrical energy.

Of course the invention is by no means limited to the form of embodiment described and illustrated, which has been given by way of example only. In particular, it comprises all means constituting technical equivalents to the means described as well as their combinations, should the latter be carried out according to its spirit and used within the scope of the following claims.

What is claimed is:

1. Thermodynamic apparatus operating on a Rankine cycle for recovering heat energy from a supercharged liquid cooled internal combustion engine, the apparatus including a closed circuit for a working fluid and means for preheating, pressurizing, vaporizing, superheating, expanding, condensing and recirculating the working fluid in the closed circuit, the preheating means comprising a first heat exchanger traversed by the heated cooling liquid from the engine and a second heat exchanger traversed by the air issuing from a supercharging compressor, the pressurizing means comprising a feed pump, the vaporizing and superheating means comprising a third heat exchanger traversed by the engine exhaust gas, the expanding means comprising a turbine, the condensing means comprising a condensor, and the recirculating means comprising a condensate pump, connected together by said closed working fluid circuit, wherein the three heat exchangers are mounted in series, the condensate pump is located between the condenser and the first heat exchanger, and the feed pump is located between the second heat exchanger and the third heat exchanger.

2. A device according to claim 1, further comprising a first auxiliary heat exchanger traversed by cold water for additionally cooling the air issuing from said second heat exchanger before the air enters the internal combustion engine and a second auxiliary heat exchanger traversed by cold water for further cooling the engine cooling liquid issuing from said first heat exchanger before returning the cooling liquid to the engine.

* * * * *